United States Patent [19]

Smiley et al.

[11] Patent Number: 5,792,251
[45] Date of Patent: Aug. 11, 1998

[54] METHOD OF PRODUCING METAKAOLIN

[75] Inventors: William D. Smiley, Salinas; George Bartich, Sutter Creek; Mike Stromberg, Jackson; Randy Lemley, Pine Grove, all of Calif.; Robert L. Antram, State College, Pa.; Keith T. Snider, Sutter Creek, Calif.

[73] Assignee: North American Refractories Co., Cleveland, Ohio

[21] Appl. No.: 800,620

[22] Filed: Feb. 14, 1997

[51] Int. Cl.$^6$ .................. C04B 33/04; C04B 14/10
[52] U.S. Cl. .................. 106/484; 106/486; 106/718; 106/811; 106/819; 501/141; 423/328.1; 423/329.1
[58] Field of Search .................. 106/484, 486, 106/718, 819, 811; 501/141, 145, 150; 241/23, 30; 423/328.1, 329.1

[56] References Cited

U.S. PATENT DOCUMENTS

| 3,014,836 | 12/1961 | Proctor, Jr. | 162/181 |
|---|---|---|---|
| 3,403,041 | 9/1968 | Lyons et al. | 106/288 |
| 4,525,518 | 6/1985 | Kostansek | 524/447 |
| 4,561,597 | 12/1985 | Cook et al. | 241/17 |
| 4,593,860 | 6/1986 | Cook et al. | 241/23 |
| 4,608,357 | 8/1986 | Silverman et al. | 502/84 |
| 4,640,715 | 2/1987 | Heitzmann et al. | 106/85 |
| 4,693,427 | 9/1987 | Bilimoria et al. | 241/23 |
| 4,793,861 | 12/1988 | Sohm | 106/99 |
| 4,842,649 | 6/1989 | Heitzmann et al. | 106/706 |
| 5,011,534 | 4/1991 | Berube et al. | 106/416 |
| 5,143,871 | 9/1992 | Leese et al. | 501/150 |
| 5,261,956 | 11/1993 | Dunaway et al. | 106/416 |
| 5,393,340 | 2/1995 | Slepetys et al. | 106/484 |
| 5,516,364 | 5/1996 | Brantley et al. | 106/484 |
| 5,537,934 | 7/1996 | Jensen et al. | 106/487 |

FOREIGN PATENT DOCUMENTS 196 08 841 C1  8/1997  Germany.

*Primary Examiner*—Michael Marcheschi
*Attorney, Agent, or Firm*—Mark Kusner

[57] ABSTRACT

A method of forming powdered metakaolin for use as an additive in cement based materials comprising the steps of calcining kaolin so as to reduce the hydroxyl content thereof to produce a meta-stable material have an identifiable amorphousness, and pulverizing the meta-stable material into a powder having a particle size of 50 microns or less.

7 Claims, 2 Drawing Sheets

METHOD OF PRODUCING METAKAOLIN

FIELD OF THE INVENTION

The present invention relates generally to cement bonded compositions, and more particularly to the manufacture and use of additives for cement bonded compositions and cement compositions made therefrom. The present invention finds particular application in the manufacture and use of metakaolin and will be described with particular reference thereto.

BACKGROUND OF THE INVENTION

The term "cement" generally refers to any substance that acts as a bonding agent for materials. In construction and engineering, the word almost always means hydraulic cement, which is produced by burning an intimate mixture of finely divided calcereous and argillaceous materials and grinding the resulting "clinker" to a fine powder, usually with gypsum, to retard the set. The burning process, conventionally referred to as a calcining process, produces calcium silicates and calcium aluminates that can chemically react with water to form a hard stone-like mass. The vast majority of hydraulic cement produced is portland cement. Portland cement is a common construction material used in mortars and concrete. Portland cement mortars are made by mixing portland cement with water and fine aggregates (sometimes other substances are added), and concrete is produced when coarse aggregate is also added. Portland cement consists mainly of calcium silicates with smaller amounts of calcium aluminates.

It is generally known that the strength and other properties of cement bonded deposits are affected by calcium hydroxide ($Ca(OH)_2$) crystals formed during the hydration/hydrolysis of the tricalcium silicate ($Ca_3SiO_5$) phase of cement. In this respect, calcium hydroxide impairs the strength and other properties of concrete bonded materials. It has been known to add materials to cement to interact with the calcium hydroxide to reduce the detrimental effect thereof on the cementitious material.

The present invention provides an improved additive for an hydraulic cement composition, which additive provides a resultant bonded material having improved strength.

SUMMARY OF THE INVENTION

In accordance with the present invention, there is provided a method of forming powdered metakaolin comprising the steps of calcining kaolin so as to reduce the hydroxyl content thereof to produce a meta-stable material having an identifiable amorphousness, and pulverizing the meta-stable material into a powder having a particle distribution less than 50 microns.

In accordance with another aspect of the present invention, there is provided an additive for hydraulic cement comprised of a kaolin material calcined to produce a very low hydroxyl-content meta-stable material having amorphous regions identifiable by conventional x-ray diffraction techniques, wherein the x-ray diffraction techniques show three amorphous peaks. The meta-stable material is pulverized to powder form wherein the powder has a statistical distribution of particle sizes based loosely upon the interstitial spacing of the compounds forming the hydraulic cement.

It is an object of the present invention to provide a cementitious based material having improved compressive strength.

Another object of the present invention is to provide a cementitious based material as described above having an additive which chemically interacts with calcium hydroxide during the setting of the cementitious based material.

Another object of the present invention is to provide a cementitious based material as described above, wherein said additive is a meta-stable kaolin material.

A still further object of the present invention is to provide a meta-stable additive for use in hydraulic cement materials to strengthen same.

A still further object of the present invention is to provide an additive as described above, wherein such additive is an amorphous metakaolin material having a low hydroxyl content.

A still further object of the present invention is to provide an additive as described above having amorphous regions identifiable by conventional x-ray diffraction techniques.

A still further object of the present invention is to provide a method of forming a meta-stable additive as defined above.

A still further object of the present invention is to provide a method of forming a highly reactive, amorphous metakaolin material.

These and other objects and advantages will become apparent from the following description of the preferred embodiments taken together with the accompanying drawings.

BRIEF DESCRIPTION OF THE DRAWINGS

The invention may take physical form in certain parts and arrangement of parts, preferred embodiments of which will be described in detail in the specification and illustrated in the accompanying drawings which form a part hereof, and wherein.

DETAILED DESCRIPTION OF A PREFERRED EMBODIMENT

Broadly stated, the present invention relates to an additive for addition to cement containing materials, and a method of forming same. The purpose of the additive is to interact with calcium hydroxide formed during the hydration/hydrolysis of the tricalcium silicate phase of cement and to reduce the detrimental effects of calcium hydroxide on the cement. More specifically, the present invention relates to a metakaolin material and a method of producing same. Ideally, the optimum structure of the metakaolin is one wherein the metakaolin is partially disintegrated and has a high internal porosity and surface area available for reaction with the deleterious alkaline products of hydration and hydrolysis of cement.

Broadly stated, the present invention relates to a method of forming metakaolin from kaolin comprised of the steps of calcining kaolin under controlled time/temperature procedures to produce a metakaolin having amorphous regions and a structure identifiable by conventional x-ray diffraction techniques. According to the present invention, the method of forming metakaolin also includes pulverizing the metakaolin into powder form of particular size and separating the amorphous metakaolin from non-reactive materials produced during the calcination step.

Referring now to the calcination step, to produce a reactive material having the amorphous structure desired, it is necessary to destroy the microcrystalline structure of the kaolin clay. This is basically accomplished by dehydration, i.e., by the removal of the hydroxyls and hydrogen ions (as water) from the kaolin structure. In the present invention, the purpose of calcination, i.e., heating of the kaolin, is to remove moisture therefrom.

By way of background kaolin is a layered material comprised of silica ions, aluminum ions, oxygen ions and hydroxyl ions. Hydroxyl ions are bonded to the aluminum ions (Al) in the gibbsite layer, to silicon ions (Si) in the layer comprised of Si—O tetrahedra and to weakly bonded hydrogen ions (H) which hold the two sheet layers together. According to the present invention, the objective of the calcination step is to remove the hydroxyl ions and hydrogen ions in a manner such that only a small percentage of the strongest bonded hydroxyls remain in the structure. In the context of the present invention, it is important to note that as kaolin is heated under controlled time/temperature conditions, amorphous regions are formed; however, if overheated, the amorphous regions re-crystallize to form nonreactive phases. Consequently, to produce an amorphous material having very high internal porosity and large surface area it is necessary to control the calcination process, and prevent overheating of the material.

Figure 2:
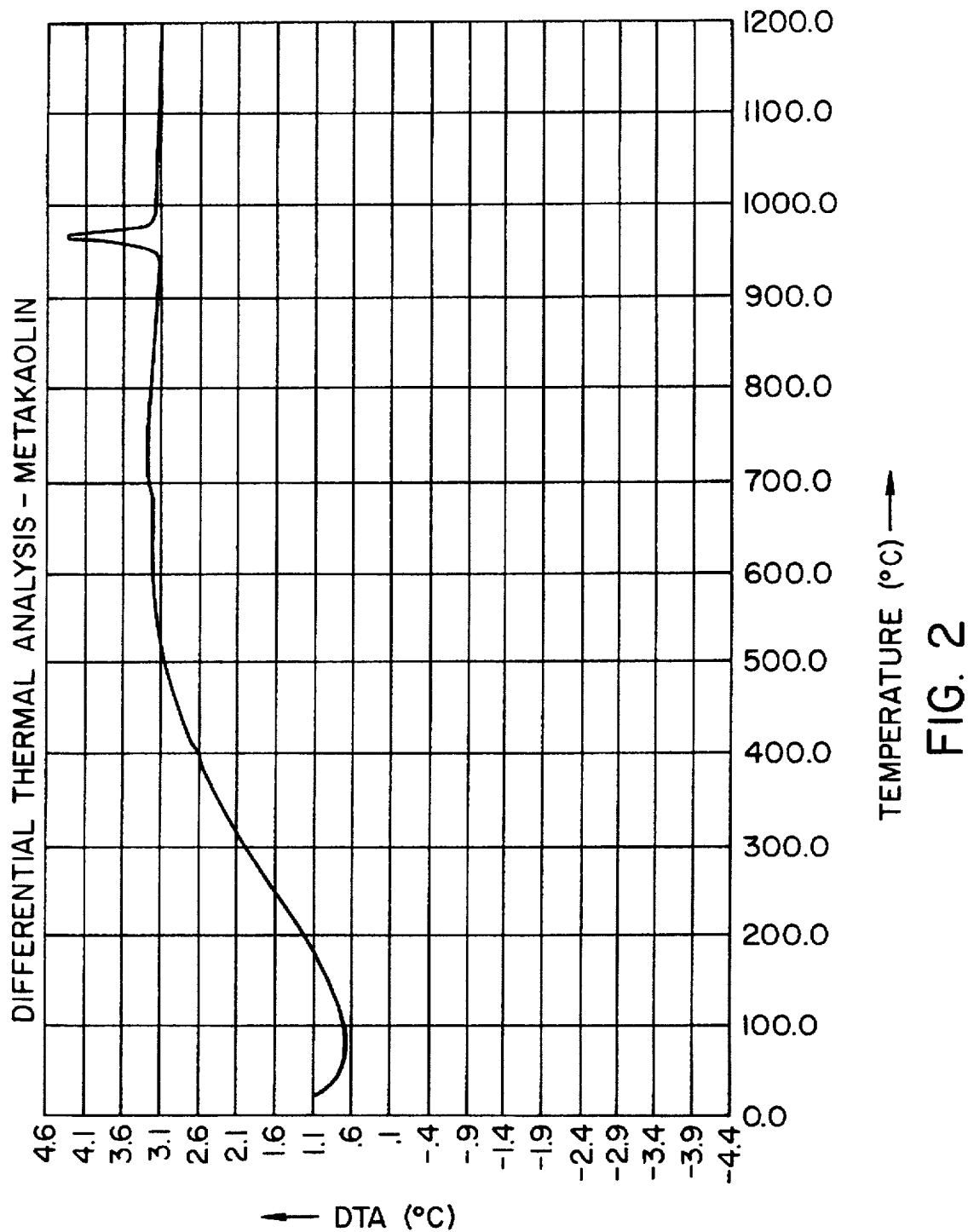
FIG. 2 is a chart of a differential thermal analysis of metakaolin illustrating the temperature at which amorphous metakaolin re-crystallizes.

According to the present invention, kaolin is heated in a kiln. The data and information set forth within the present specification were obtained from calcining kaolin in a conventional rotary kiln. The kaolin was introduced into the kiln as an extrudate from a pug mill. The kaolin has a spaghetti-like shape (approximately ⅛" in diameter) as it enters the kiln. As the kaolin proceeds through the kiln, the extrudate breaks down into pellets as a result of the calcination process. As the kaolin enters the kiln, it has a moisture content of approximately 25% by weight. This moisture level is necessary to facilitate the extrusion of the kaolin. A small amount of a binder (such as alum) is added to the kaolin to provide "green strength" to the kaolin so as to prevent the kaolin from completely breaking down into powder form during the calcination process. It will, of course, be appreciated that the original shape and size of the kaolin introduced into the kiln, in and of itself, is not critical to the process and material defined by the present invention. It is only necessary that the kaolin have a shape and size to facilitate efficient calcining. Moreover, the type of kiln in which the kaolin is calcined, in and of itself, is not critical to the invention. The temperature within the kiln, however, is important to the present invention. Foremost, the temperature of the kiln in which the kaolin is calcined should be above 1580° F., but should not exceed approximately 1750° F. At approximately this temperature (i.e., 1750° F.), any amorphous regions of metakaolin begin to re-crystallize. FIG. 2, which is a differential thermal analysis (DTA) graph, illustrates that heating metakaolin produces an exothermic effect at approximately 975° C. (1780° F.) signifying that at this temperature re-crystallization occurs.

The period of time for calcination of kaolin to produce metakaolin is based upon the temperature in the kiln to which the kaolin is subjected. The higher the temperature, the shorter the calcination time, and conversely, the lower the temperature, the higher the calcination time. According to one aspect of the present invention, to ensure the conversion of the kaolin to metakaolin having the desired amorphous condition, the calcination process is preferably monitored by "ignition loss" measurements of the metakaolin kiln products. In this respect, it has been found that ignition loss measurements are indicative of the condition of the product, and can provide a gauge as to whether the residence time and temperature gradient existing within the kiln need adjustment to produce the product of desired reactivity.

Ignition loss is a measure of the residual kaolinite, the residual hydroxyl, in metakaolin recovered from a kiln. The residual hydroxyl is determined by refiring a small sample of the metakaolin to a temperature sufficiently higher than the temperature experienced in the kiln so as to remove the last traces of hydroxyl and measuring weight loss. The test for ignition loss consists of weighing out an approximate 10 gram sample of cooled kiln product (obtained from the exit end of the kiln) in a suitably small prefired, cooled, "tared" alumina crucible weighing approximately 15 grams. The weight of both sample and crucible is measured to the fourth decimal point. The crucible containing the metakaolin sample is inserted in a laboratory furnace preheated to 1100° C. and held there for 30 minutes, after which the sample is removed and cooled to near room temperature. The weight of the sample and crucible is remeasured, and the "tare" is subtracted to obtain the new calcined weight of the sample. The change in weight (due to loss of residual hydroxyl) divided by the original weight constitutes the ignition loss fraction.

According to the present invention, it has been found that highly reactive metakaolin having high internal porosity and surface also may be obtained by controlling the kiln temperature and operation to maintain an "ignition loss" of between 0.2% and 1%, and more preferable maintaining the ignition loss at 0.6%. An ignition loss of 0.6% being the optimum to be maintained to produce a highly reactive material. Ignition losses lower than 0.2% signify that the temperature of the metakaolin has exceeded the critical temperature and that re-crystallization of the metakaolin material has initiated. Accordingly, the calcination temperature of the kiln should be reduced. Conversely, losses of 1% or higher indicate that kaolinitic hydroxyl remains and there is too little decomposition of the kaolin. Importantly, the "ignition loss" means of control, as described heretofore, applies equally well to all types of kilns, including rotary kilns, multiple hearth kilns, flash and fluidized bed kilns, etc. By monitoring the ignition loss, which loss is a measurement of residual hydroxyl in the kaolin, the desired amorphous structure having a very high internal porosity and surface area available for reaction may be obtained.

Figure 1:
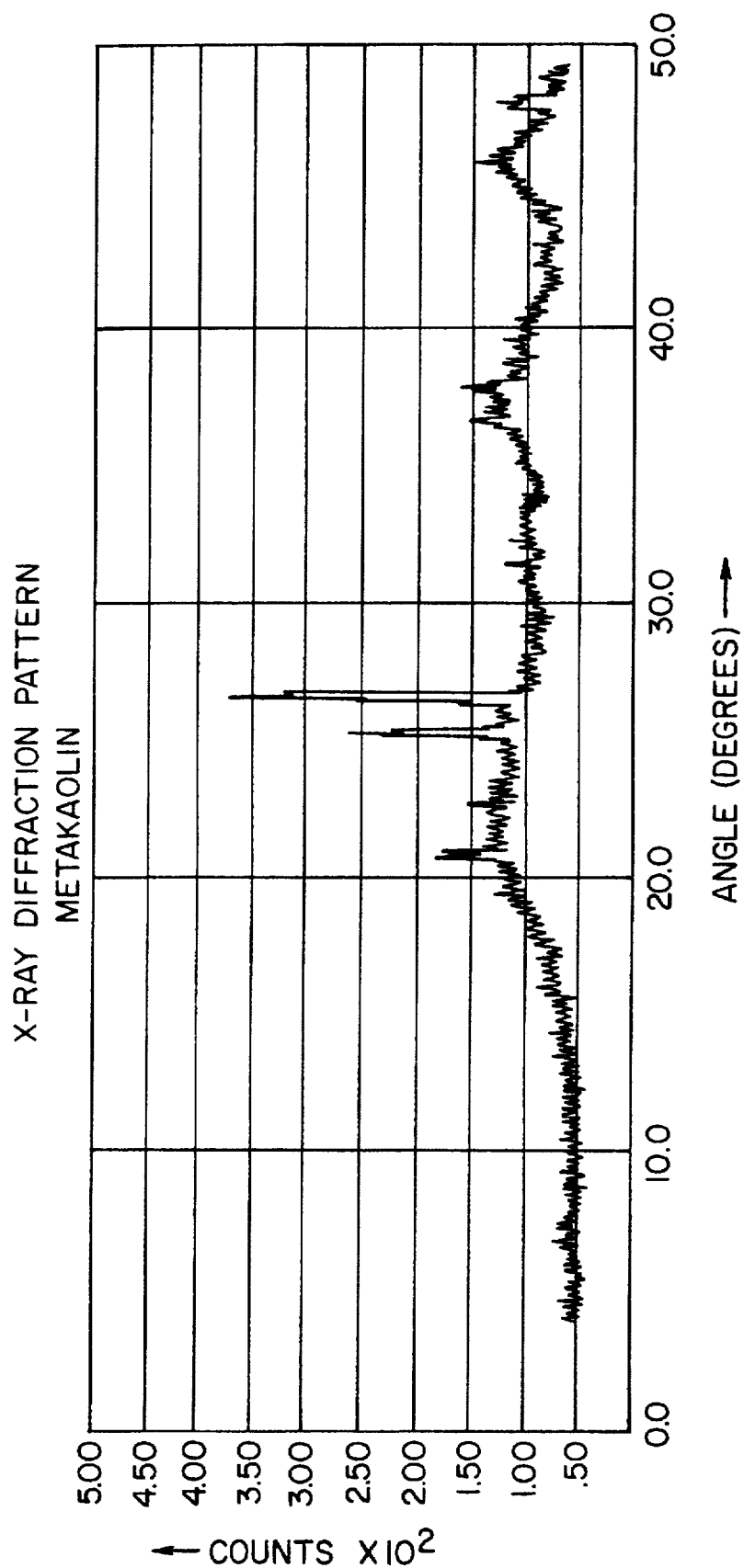
FIG. 1 is a x-ray diffraction graph illustrating identifiable amorphous peaks of a metakaolin material according to the present invention.

By calcining kaolin under the foregoing conditions, a specific amorphous "metakaolin" material is produced. Metakaolin is an unstable form of kaolin. Its instability results from the high energy amorphous regions produced by the controlled thermal processing of the kaolin. The metakaolin resulting from the foregoing calcination step includes amorphous regions that provide very high internal porosity and surface area available for reaction with the deleterious alkaline products of hydration and hydrolysis of cement. These amorphous regions are identifiable by conventional x-ray diffraction techniques and produce an identifiable x-ray pattern showing amorphous humps centered at 2θ equals approximately 22°, 37° and 46° as seen in FIG. 1. Note that the characteristic major kaolinite peaks are absent at 2θ equal 12° and 24.5° indicating a major loss of hydroxyl. Identifiable spikes in the graph at 21° and 26.5° represent crystalline silicon dioxide ($SiO_2$). The spike at 2θ equal 25° indicates the presence of anatase. As is well known, the broad humps are a result of the lack of long-range order of amorphous materials. The resulting structure can also be identified by infrared absorption technique showing absorption bands at 3695 $cm^{-1}$, 3620 $cm^{-1}$ and 3650 $cm^{-1}$.

As indicated above, it is important to maintain the temperature of the kaolin material at a temperature below approximately 1780° F. (975° C.). It will, of course, be appreciated that the temperature of the furnace or kiln in which the calcining takes place will generally be higher than the actual temperature of the metakaolin. As shown in FIG. 2, differential thermal analysis of metakaolin reveals the absence of the endothermic heat effect for kaolin which occurs between 650° C. and 750° C. with dehydroxylation. An exothermic effect is observed at 975° C. indicating that re-crystallization of the amorphous regions of the material has occurred during calcination. Re-crystallization indicates the formation of nonreactive phases.

In summary, the calcination step is conducted to destroy the microcrystalline structure of kaolin basically by a decomposition process (i.e., the removal of the hydroxyl and hydrogen ions from the kaolin structure) to form an amorphous structure having very high internal porosity and surface area. The calcination process is controlled by maintaining an ignition loss having a target of 0.6% plus or minus 0.4%.

In addition to x-ray diffraction techniques and infrared absorption tests, it has been found that the color of the metakaolin product ultimately produced is also an indicator as to whether the thermal process was controlled properly. In this respect, color is an indicator only for metakaolin made from kaolin containing more than 1% anatase as impurity. Anatase is one of the trimorphic forms of titanium dioxide, and is found in most all kaolin. Anatase converts to brookite, a second trimorphic form of titanium dioxide, at temperatures above 1580° F. but below 1900° F. This transformation produces a pink color which may be used as an indication that the desired temperature and structure have been obtained. If the kaolin is heated above 1900° F., the brookite converts to the rutile phase of titanium dioxide and the pink color is lost. Thus, a properly calcined product will show a slight pinkish color, whereas overheated material will not.

In addition to being a transition temperature providing a visual means for determining a properly controlled calcining process according to the present invention, it is believed that 1580° F. should be a lower threshold temperature in that it has been observed that some clay materials, when fired below 1580° F., have a tendency to rehydrate and to lose reactivity when exposed to moisture. In the context of the present invention, it is highly desirable to avoid the possibility of such rehydration of the resulting material, for example, during shipping or storage.

Referring now to the second step of the process, which step involves the reduction of the metakaolin formed through the foregoing calcination step to provide a material having a particle size distribution related to the cement with which it is ultimately to be used. Preferably, the metakaolin is pulverized into powder form wherein the powder has a statistical distribution of particle sizes based loosely upon the interstitial spacing of the components of the hydraulic cement which is to be used. In other words, the range of particle sizes of the powdered metakaolin is provided to fit among and between the particulate and materials forming the cement. Preferably, the metakaolin is pulverized into a particle size finer than that of the components of the cement. In this respect, it is important to have a powder metakaolin finer than that of the cement's components to insure that the tricalcium silicate ($Ca_3SiO_5$) particulate within the cement, which generates the deleterious calcium hydroxide as the cement sets, will have a surrounding environment of the reactive metakaolin particles. In this respect, it has been found that the strength of the overall cement based composite increases with the fineness of the cement. It is believed that a small fraction of the cement having a particle size of 5 microns or less is necessary to develop substantial strength after one (1ay set. The fraction from 5 to 15 microns may be classified as the most important source of ultimate strength. In most cases, the fineness of the particle distribution should allow for placement of the metakaolin particles within the interstices created by the packing of the sand, the cement and other particulate components of the cement composite. However, it also is important that the particle size of the metakaolin not be too fine. In this respect, the finer the metakaolin, the greater the amount of water needed to produce a flowable mixture when the metakaolin is added to the cement, and a higher water-to-cement ratio can adversely affect the properties of the cement composition. Thus, in the context of the present invention, the particle size of the metakaolin is important. It is believed that the following particle size distribution attained by grinding and pulverizing techniques is appropriate: +325 mesh (45 microns) residue, less than 1% by weight; approximately 90% of the powdered metakaolin having particle size of approximately 15 microns or less; approximately 50% of the powdered metakaolin having a particle size of approximately 5 microns or less; and, approximately 10% of the powdered metakaolin having a particle size of 2 microns or less.

As with the foregoing calcination step, the mechanical equipment necessary to pulverize and grind the metakaolin, in and of itself, is not important to the present invention so long as the resultant material has a fineness and particle size distribution to enable packing of the metakaolin particles within the interstices created by the components of the cement based material.

The final step in the process is to separate the powdered metakaolin from over-fired materials. In this respect, when calcining the kaolin, it is likely that a small fraction of the kaolin will be over-fired (i.e., overheated) wherein portions of the amorphous regions of the metakaolin may re-crystallize into nonreactive phases as described above. These re-crystallized portions do not have the reactivity of the amorphous regions of the metakaolin material, and their removal from the powder is essential to obtain the maximum reactivity of the resultant material. Because re-crystallized particles and over-fired materials are much harder than the amorphous metakaolin, they are less susceptible to size reduction by pulverization, and therefore, become a coarse constituent in the pulverized powder. Removal of these coarse particles may therefore be accomplished by mechanical air classifying, such as by a hurricane mill or other conventionally known particle separators.

The separating step results in a powdered metakaolin having very high internal porosity and surface area and a material that is highly reactive with the deleterious alkaline products of the hydration and hydrolysis of cement. As indicated above, the metakaolin is a highly energetic material having amorphous regions, the structure of which is identifiable by conventional x-ray diffraction techniques.

It has been found that metakaolin formed in accordance with the foregoing process when added to hydraulic cement provides superior properties. The following Table I shows comparative testings of portland cement with and without the metakaolin produced as described above.

TABLE I

|                              | MIX 1   | MIX 2   |
| ---------------------------- | ------- | ------- |
| TEST DATA                |         |         |
| Type 10 cement (g)           | 667     | 617     |
| Graded Standard Sand (g)     | 1427.8  | 1427.8  |
| Metakaolin (g)               | 0       | 50.0    |
| Water (g)                    | 322.7   | 336.0   |
| W/C Ratio                    | 0.483   | 0.504   |
| Flow (%)                     | 98 ± 5  | 94 ± 5  |
| TEST RESULTS             |         |         |
| Compressive Strength (MPa)   | 43.7    | 39.7    |
| Strength Activity Index @ 3 days | 1.00 | 0.91   |
| Compressive Strength (MPa)   | 52.7    | 52.7    |
| Strength Activity Index @ 7 days | 1.00 | 1.00   |
| Compressive Strength (MPa)   | 64.4    | 73.3    |
| Strength Activity Index @ 28 days | 1.00 | 1.14  |

In the foregoing table, MIX 1 represents a type 10 cement without an additive to interact with the calcium hydroxide formed during the hydration of the cement. MIX 2 represents the same type of portland cement wherein a portion of the cement is replaced with metakaolin manufactured according to the present invention. As seen in Table I, 50.0 grams of metakaolin replaced 50.0 grams of cement in MIX 2. Like amounts of sand were added to each mix. Slightly more water was added to MIX 2. The test results show that while the compressive strength of MIX 2 was initially lower, after seven days, the compressive strengths of the respective materials were the same, and that after 28 days, noticeable improvement in the compressive strengths existed with respect to MIX 2, i.e., the cement based compound using the metakaolin additive formed as described above.

It is believed that the increase in the compressive strength is attributable to the high reactive metakaolin and its beneficial interaction with calcium hydroxide during the hydration of the cement.

The present invention has been described with respect to preferred embodiments. Modifications and alterations may occur to others upon a reading and understanding of the specification. It is intended that all such modifications and alterations be included insofar as they come within the scope of the invention as claimed or the equivalents thereof.

Having described the invention, the following is claimed:

1. A method of forming amorphous metakaolin, comprising the steps of:
   placing kaolin within a furnace, wherein said kaolin is exposed to a temperature exceeding 1580° F. (860° C.);
   controlling the temperature of said kaolin within said furnace in order to maintain the temperature of said kaolin below about 1750° F. (about 955° C.); and
   maintaining said kaolin within said furnace for a time sufficient to produce metakaolin having an ignition loss of between about 0.3% and 1%.

2. A method as defined in claim 1, wherein said metakaolin comprises particles having the following particle size distribution:
   (a) less than 1% by weight of said particles are greater than 45 microns (+325 mesh),
   (b) approximately 90% of said particles have a particle size of approximately 15 microns or less,
   (c) approximately 50% of said particles have a particle size of approximately 5 microns or less, and
   (d) approximately 10% of said particles have a particle size of approximately 2 microns or less.

3. A method as defined in claim 7, further comprising the steps of:
   pulverizing said metakaolin into a powder having a particle size of 50 microns or less.

4. A method of forming powdered, amorphous metakaolin, comprising the steps of:
   extruding kaolin into a strand;
   heating said kaolin by conveying said strand of kaolin through a heating furnace having an entrance end for receiving said kaolin strand and an exit end for discharging said kaolin after said heating, said heating furnace having a temperature zone exceeding 1580° F. (about 860° C.) between said entrance end and said exit end;
   controlling the temperature of said kaolin within said furnace in order to maintain said kaolin a temperature below about 1780° F. (about 975° C.);
   heating said kaolin within said heating furnace for a sufficient period of time to form an amorphous metakaolin, wherein said amorphous metakaolin discharged at said exit end of said furnace has an ignition loss of between about 0.3% and 1%; and
   pulverizing said metakaolin into a powder having a particle size of 50 microns or less.

5. An additive for hydraulic cement, comprising: a kaolin material which has been calcined at a temperature sufficient to produce a meta-stable material having a reduced hydroxyl content, an ignition loss of between about 0.3% and 1%, and a x-ray diffraction pattern having three amorphous peaks, said meta-stable material being pulverized into powder form wherein the three amorphous peaks are located at points where 2θ equals approximately 22°, 37° and 46°.

6. A method of forming amorphous metakaolin, comprising the steps of:
   placing kaolin within a furnace, wherein said kaolin is exposed to a temperature exceeding 1580° F. (860° C.);
   controlling the temperature of said kaolin within said furnace in order to maintain the temperature of said kaolin below about 1750° F. (about 955° C.); and
   maintaining said kaolin within said furnace for a time sufficient to produce a material having a pinkish hue and an ignition loss of between about 0.3% and 1%.

7. An additive as defined in claim 5, wherein said additive has a particle size distribution wherein said meta-stable material comprises particles having the following particle size distribution:
   (a) less than 1% by weight of said particles are greater than 45 microns (+325 mesh),
   (b) approximately 90% of said particles have a particle size of approximately 15 microns or less,
   (c) approximately 50% of said particles have a particle size of approximately 5 microns or less,
   (d) approximately 10% of said particles have a particle size of approximately 2 microns or less.

* * * * *